(12) United States Patent
Zircher

(10) Patent No.: US 11,921,875 B1
(45) Date of Patent: Mar. 5, 2024

(54) ZERO TRUST SYSTEM AND METHOD FOR SECURING DATA

(71) Applicant: Transparent Technologies, Inc., Fleming Island, FL (US)

(72) Inventor: Dana Zircher, Los Angeles, CA (US)

( * ) Notice: Subject to any disclaimer, the term of this patent is extended or adjusted under 35 U.S.C. 154(b) by 0 days.

(21) Appl. No.: 18/241,183

(22) Filed: Aug. 31, 2023

(51) Int. Cl.
*G06F 21/62* (2013.01)
*G06F 21/57* (2013.01)

(52) U.S. Cl.
CPC ........ *G06F 21/6218* (2013.01); *G06F 21/575* (2013.01); *G06F 2221/034* (2013.01)

(58) Field of Classification Search
CPC .............. G06F 21/6218; G06F 21/575; G06F 2221/034
See application file for complete search history.

(56) References Cited

U.S. PATENT DOCUMENTS

| | | | | |
|---|---|---|---|---|
| 9,215,512 | B2* | 12/2015 | Cohen | H04N 21/8355 |
| 10,068,285 | B2* | 9/2018 | Cefkin | G06Q 30/08 |
| 10,223,014 | B1* | 3/2019 | Atsatt | G06F 3/0629 |
| 2013/0250813 | A1* | 9/2013 | Janz | H04L 41/0809 370/255 |
| 2015/0177708 | A1* | 6/2015 | McDonald | G05B 11/01 700/52 |
| 2017/0046520 | A1* | 2/2017 | Ohrimenko | G06F 9/5066 |
| 2017/0169220 | A1* | 6/2017 | Fish | H03K 19/17768 |
| 2017/0295025 | A1* | 10/2017 | Meriac | H04W 12/0431 |
| 2017/0337380 | A1* | 11/2017 | Domke | H04L 9/3242 |
| 2018/0157839 | A1* | 6/2018 | Pearson | G06F 21/602 |
| 2019/0007212 | A1* | 1/2019 | Neve de Mevergnies | G06F 21/72 |
| 2019/0042229 | A1* | 2/2019 | Kotary | G06F 8/65 |
| 2019/0114283 | A1* | 4/2019 | Deval | G06F 9/4856 |
| 2019/0130282 | A1* | 5/2019 | Quirk | G06N 3/08 |
| 2020/0134185 | A1* | 4/2020 | Cho | G06F 21/602 |
| 2020/0213115 | A1* | 7/2020 | Mathane | G06F 21/575 |
| 2021/0089684 | A1* | 3/2021 | Cui | G06F 21/575 |
| 2021/0150033 | A1* | 5/2021 | Trivedi | H04L 63/065 |
| 2021/0281420 | A1* | 9/2021 | Szubbocsev | H04L 9/0833 |
| 2021/0348213 | A1* | 11/2021 | Ma | C07K 14/7051 |
| 2022/0057995 | A1* | 2/2022 | Cappello | G06F 7/57 |

(Continued)

*Primary Examiner* — Gary S Gracia
(74) *Attorney, Agent, or Firm* — Wilson Dutra, PLLC; Camille A. Wilson

(57) ABSTRACT

Generally, systems and methods for securely establishing data transfer, storage, and execution are presented. The system may comprise a computing device that comprises at least one programmable integrated circuit. The programmable integrated circuit may comprise multiple independently loadable partitioned segments. A first partitioned segment of the programmable integrated circuit may comprise one or more factory-installed secrets in the form of data, wherein the factory-installed secrets may be configured to convert data from an untranslated state to a translated state, and vice versa. A second partitioned segment may comprise storage-at-rest data for at least one authenticable user of the computing device. The computing device may comprise at least one storage medium that comprises data, including data comprising one or more boot instructions for the computing device, that may be in an untranslated state. Therefore, the computer is not a computer, until it acquires a trusting user's authentication, thereby unlocking its commands.

4 Claims, 8 Drawing Sheets

(56) References Cited

U.S. PATENT DOCUMENTS

| | | | |
|---|---|---|---|
| 2022/0109667 A1* | 4/2022 | Gorog | H04L 9/0827 |
| 2023/0124661 A1* | 4/2023 | Liu | G06F 21/575 |
| | | | 713/1 |
| 2023/0205743 A1* | 6/2023 | Johnas | G06F 16/22 |
| | | | 707/692 |
| 2023/0308275 A1* | 9/2023 | Kambara | C12N 15/1065 |
| | | | 713/171 |

* cited by examiner

300

```
        ┌─────────────┐
        │ Cont. from  │
        │  FIG. 3A    │
        └──────┬──────┘
               ▼
   ┌───────────────────────┐
   │ Initiate login sequence│
   │                    340 │
   └───────────┬───────────┘
               ▼
   ┌───────────────────────┐
   │  Provide login prompt │
   │                    345│
   └───────────┬───────────┘
               ▼
   ┌───────────────────────┐
   │Receive authentication │
   │ input              350│
   └───────────┬───────────┘
               ▼
   ┌───────────────────────┐
   │Acquire operating      │
   │ system session     355│
   └───────────┬───────────┘
               ▼
           ╱Data╲         NO    ┌──────────────────┐
          ╱match?╲─────────────▶│ Offload factory- │
          ╲ 360  ╱              │ installed secrets│
           ╲    ╱               │              370 │
            ╲YES                └────────┬─────────┘
             ▼                           ▼
   ┌───────────────────────┐      ╭──────────────╮
   │Facilitate data flow to│      │Computing     │
   │convert operating      │      │device is     │
   │system instructions to │      │rendered      │
   │translated state    365│      │unusable   385│
   └───────────┬───────────┘      ╰──────────────╯
               ▼
   ┌───────────────────────┐
   │Initialize operating   │
   │system session      375│
   └───────────┬───────────┘
               ▼
        ╭──────────────────╮
        │Initiate first    │
        │execution cycle of│
        │computing device  │
        │              380 │
        ╰──────────────────╯
```

FIG. 3B

ZERO TRUST SYSTEM AND METHOD FOR SECURING DATA

BACKGROUND

"Cryptography," derived from the Greek Kryptos, meaning hidden, is the study of secure communications using encryption. The practice dates back to 2000 B.C. ancient Egypt, where Egyptian monks developed a unique photocryptographic system with non-standard hieroglyphics known only to an elite few. In today's digital era, encryption has evolved into one of the most used and effective forms of data security. Today, encryption typically consists of a procedure of encoding information to prevent access to those who do not have a decryption key.

The development of cryptography has continued to progress with society as governments, businesses, organizations, and individuals continuously work to develop new ways to hide and protect sensitive data. Perhaps the most well-known cipher device is the Enigma machine, developed in the early $20^{th}$ century and used extensively by Nazi Germany in World War II. This old technology utilized an electromechanical rotor mechanism and a plurality of rotating wheels, scrambling the alphabet, to convert entered plaintext into ciphertext or entered ciphertext into plaintext.

More recently, cryptography has become a battle between the world's greatest scientists and mathematicians, working to create a means of digital encryption that is both secure and reliable. Using algorithms and a key, computer-based technologies are able to transform plaintext into encrypted ciphertext. The encrypted ciphertext is designed to only be decrypted by those who have access to its specific key. As newly developed algorithms generate ever-increasing amounts of ciphertext combinations, attackers struggle to determine any properties of the original plaintext or its respective key.

While increases in the size of encryption keys have made it more difficult to break the underlying decryption code, increases in computing power have made even these advanced attempts at securing data futile. For example, quantum computers exist that can crack the encryption guarding Bitcoin™ data within 10 minutes. To put this into context, the 256-bit SHA hash encryption that Bitcoin™ uses offers the same level of security as virtual private networks (VPNs), the military, and many large banks. While breaching the data protected by these advanced modern encryption systems may be unlikely due to the significant expense required to implement and facilitate breach processes, the potential risk for great harm does exist, and a successfully executed attack can have drastic consequences. Additionally, in some cases, a single encryption key may be licensed for use by many different customers. Not only does this shared secret entice hackers by potentially rewarding a successful decryption attack with a myriad amount of data, but the consequences resulting from such an attack can be far reaching. A wide variety of data may be globally compromised. Not only is computer-stored data vulnerable to deficiencies in current encryption methods, the architecture of a traditional computing device is full of potential access points for hackers and other unauthorized users to exploit to attempt to access or steal data. For example, because conventional login sessions start after a computer's operating system boots up, the relatively unsecured nature of the computing device after operating system initialization and prior to user login can present a prime opportunity for hackers to access the computing device and make sophisticated attempts to decrypt data stored within the device. In this scenario, the computer must be 'assumed trustworthy' or the user's secret login credentials may be compromised while obtaining a session, without any knowledge of such a breach. Devices have been developed to skim such secrets, and such devices are often used to illegally obtain a single secret required to breach the breadth of the user's information.

In recent years, electronic functionality has been enhanced by a type of integrated circuit called a field-programmable gate array, or "FPGA." FPGAs are designed to be configured by a designer or end user after being manufactured. Structurally, FPGAs comprise an array of programmable logic blocks as well as a hierarchy of reconfigurable interconnects that allow the blocks to be wired together. The logic blocks can be configured to perform a variety of complex combinational functions or act as simple logic gates. Most FPGAs have logic blocks that also include memory elements, which may range from simple flip-flops to more complete blocks of memory. Although FPGAs are often preprogrammed for use in specific applications, many FPGAs can be reprogrammed to implement different logic functions, thereby allowing for flexible reconfigurable computing, thus offering significant potential utility in a wide variety of applications.

The cycle of evolving ever more powerful derivative encryption, at the expense of ever-increasing computational requirements, excessively bloating payload sizes, only to be dismantled via competing countermeasures, is unsustainable. Enhanced computing power, brute-force methods, and near future quantum algorithms, will render such derivative works pointless. Although FPGAs have been implemented in various ways to enhance existing computer systems, their current configuration of running on top of existing computer architectures leaves even the most modern computing devices vulnerable to issues related to data security and trust. Sensitive data continues to be at risk without an alternative to current data encryption methods, one that is not breakable using expensive equipment and high-powered computers. Preferably, methods of data protection need to move away from traditional forms of encryption to seal data in a way that protects it from exposure to unauthorized users.

SUMMARY OF THE DISCLOSURE

What is needed are systems and methods for secure data transfer and storage that are not dependent on traditional data encryption approaches. Systems and methods for secure data transfer and storage that take advantage of the programmable nature of programmable integrated circuits such as FPGAs are also desired.

In light of the foregoing, the present disclosure is directed to systems, methods, and computer program products that utilize one or more programmable integrated circuits to protect data being transferred between two or more computing devices and/or to protect data stored within one or more storage media within at least one computing device.

In some aspects, a computing device is disclosed that comprises at least one programmable integrated circuit. In some implementations, the programmable integrated circuit may comprise an FPGA. In some aspects, the programmable integrated circuit may comprise two or more partitioned segments, wherein each partitioned segment may be independently loadable and may be programmed or configured for a different purpose. In some embodiments, a first partitioned segment of the programmable integrated circuit may comprise one or more factory-installed secrets for converting at least one datum within at least one storage medium within the computing device from an untranslated state to a translated state, and vice versa. In some implementations, data may be usable by the computing device while in the translated state.

In some implementations, the one or more factory-installed secrets within the first partitioned segment of the programmable integrated circuit may be installed during the manufacturing of the disclosed computing device. In some aspects, the factory-installed secrets may only be writable one-time. In some implementations, the factory-installed secrets may be inaccessible after being installed. In some aspects, an attempt to access the factory-installed secrets after installation may result in the factory-installed secrets being unloaded or cleared from the first partitioned segment of the programmable integrated circuit. In some embodiments, the factory-installed secrets may be unique to the computing device within which they are installed.

In some aspects, the programmable integrated circuit of the computing device of the present disclosure may comprise a second partitioned segment that comprises an amount of data associated with at least one user in a storage-at-rest state. In some implementations, the data in the storage-at-rest segment of the programmable integrated circuit may enable at least one user to be authenticated. In some embodiments, authenticating at least one user, may be required before the factory-installed secrets of the first partitioned segment of the programmable integrated circuit are able to convert any of the untranslated data within one or more storage media to a translated state. In some aspects, one or more non-primary partitioned segments of the programmable integrated circuit may comprise storage-at-rest data for a plurality of users, wherein each of the plurality of users may be independently authenticated to start unique secure authenticated sessions on a single computing device, wherein an authenticated user may only be able to access data in a translated form via the computing device that the authenticated user is permitted to access during an authenticated session, such as data that originated from or was designated for the authenticated user, as non-limiting examples. In some implementations, a plurality of authenticated sessions may be accessible on a single computing device by a plurality of different users, wherein each authenticated session may be completely partitioned cryptographically from all other authenticated sessions without requiring any access controls or configured user permissions due to the computing device limiting access to the translated form of data that is specifically included in an authenticated session for the authenticated user associated with that authenticated session. In some embodiments, the ability of a computing device to host multiple authenticated sessions may be critical for virtual-machinery running on a zero trust computing device.

In some implementations, the programmable integrated circuit of the computing device of the present disclosure may comprise a third partitioned segment configured to route data from one portion of the computing device to another through the programmable integrated circuit, wherein in some aspects the routing may at least partially comprise changing the data to a translated state or to an untranslated state via the first and second partitioned segments of the programmable integrated circuit so that the data may be used by or stored within one or more portions of the computing device. In some aspects, converting data to an untranslated state may comprise a self-recursive process, such as via patching multiple layers within the at least one programmable integrated circuit. In some non-limiting exemplary embodiments, the at least one programmable integrated circuit may convert data to a first untranslated state and to one or more subsequent untranslated states. In some aspects, the conversion from a first untranslated state to subsequent untranslated states may comprise the implementation of different configuration parameters for each subsequent conversion, thereby resulting in more resilient linear addressing encryption that has no known computational reversibility. By way of example and not limitation, untranslated data within an encryption context relative to the computing device must be routed through at least one processor register for consumption in a translated form. In some implementations, no bulk translation methods are exported by the at least one programmable integrated circuit; instead, only individual bytes may be interpreted in their translated form. As a non-limiting example, when reading data through a file or memory stream: objFileStreamReader.OpenByte(0).

In some aspects, the present disclosure may be directed to at least one method for initializing a secure authenticated session within a computing device that comprises at least one programmable integrated circuit. In some embodiments, at least a portion of the data stored within at least one storage medium of the computing device may comprise one or more instructions for starting or booting up the computing device and loading its drastically simplified BIOS (basic input/output system). In some implementations, the method may comprise authenticating a user via data stored within a storage-at-rest partitioned segment of the programmable integrated circuit, wherein successfully authenticating the user is required to enable a partitioned segment of the programmable integrated circuit comprising one or more factory-installed secrets in the form of data to access the instructions for the boot process of the computing device and convert the instructions from an untranslated state to a translated state, wherein the instructions in the translated state may be directed via the programmable integrated circuit to one or more processor registers of the computing device, thereby allowing the computing device to use the simple instructions to start authentication, and yield until signaled to continue loading from the now 'translated' computer instructions and resume loading its operating system. In some non-limiting exemplary embodiments wherein a single computing device may enable access to a plurality of independent authenticated sessions by different authenticated users, each authenticated user may have the ability to load the computing device's operating system and thereby initialize the execution cycles of the computing device by establishing an authenticated session.

In some implementations, the present disclosure may be directed to at least one method for storing data securely in a computing device that comprises at least one programmable integrated circuit and for retrieving data from a secure storage location. In some aspects, the computing device may comprise at least one storage medium or memory device, such as random-access memory, a hard disk drive, or a solid-state drive, as non-limiting examples. In some implementations, all of the data stored within the storage media of the computing device may comprise an untranslated state that is incomprehensible to any user or even to the computing device itself. In some non-limiting exemplary embodiments, the computing device may comprise a zero trust computing platform, meaning the computing device may be unable to execute any code or instructions without such code or instructions being converted from an untranslated state to a translated state via one or more configurations of the programmable integrated circuit that may be established by the formation of an authenticated session by an authenticated user. In some aspects, any code that does not originate from or is not associated with activity of an authenticated user during an authenticated session, such as, for example and not limitation, code that may originate from a source external from the computing device and that may be harmful or malicious to the computing device, may fail to be executed by the computing device due to the inability of the computing device to execute any code without first establishing an authenticated session for an authenticated user.

In some aspects, storing data in an untranslated state may be equivalent to converting data from a translated state to an untranslated state via the programmable integrated circuit. In other words, this methodology may be used independently of a zero trust computing device to achieve bulk encryption of equal durability. In some implementations, storage of the data may be associated with an authenticated user of the computing device. In some aspects, once the data are stored, the data may only be accessed in a translated form by being routed back through the programmable integrated circuit by the authenticated user of the computing device who has both permission to access the data, as well as permission to access the computing device. In some embodiments, the data may only be available in an inverse, translated form under the precise conditions under which the data was sealed. By way of example and not limitation, an authenticated user may only access the translated form of data using the same computing device using the same factory-installed secrets and the same layers or stacks of untranslations that were used to generate the untranslated form of the data.

In some aspects, any attempt to access data in its translated form by a user that has not been authenticated may cause the factory-installed secrets within the programmable integrated circuit needed to convert the data from its untranslated form to its translated form to be offloaded, erased, or otherwise cleared, thereby rendering the translated state of the data completely unachievable, even for users who may be authenticated at the local computing device. In some implementations, the instructions needed to perform the boot process for the computing device may also be inaccessible in their translated form, thereby preventing the computing device from functioning in any way. In some embodiments, using this configuration to store all persistent data, including programmable data such as EPROMS and prompts, may cause the data to be impervious to reverse engineering efforts in that none of the underlying instructions will ever be revealed in their executable form.

In some implementations, the present disclosure may be directed to at least one method for securely transferring data between two or more computing devices, wherein each computing device may comprise at least one programmable integrated circuit. In some embodiments, data may be sent from a first computing device in an untranslated state and received by a second computing device in the same untranslated state, wherein at least one programmable integrated circuit of the second computing device may be able to convert the data to its translated state only if an authenticated user of the second computing device has permission to access the translated data. In some implementations, user permissions, an operating system nomenclature for short-circuiting access to information, may at least partially comprise the establishment of a secure relationship between the first computing device and the second computing device. It is important to note that this annotation is simply ceremonial or decorative in nature, and in no way indicates a user's ability to translate data to its clear form, even if the user may be granted permission to access the data. In some aspects, this may prevent a user from accessing the translated form of data to which the user may have inadvertently, erroneously, or illicitly obtained permission to access, thereby restricting the user's access to only the untranslated form of the data.

In some aspects, data transferred between the first computing device and the second computing device, or between different locations within one or more storage media within a single computing device, may comprise one or more untranslation layers or stacks. This is distinct from procedurally encrypting data with either multiple conventional algorithms, or double-encryption. In some embodiments, attempts by unauthorized users to overcome one or more secondary encryption layers may be detectable, while attempts to convert the underlying data from its untranslated form to its translated form may be undetectable while the data is in transit. In this way, the one or more secondary encryption layers may provide insight into unauthorized attempts to access the data, while providing secondary security means which may otherwise be redundant in some cases. In some aspects, one or more secondary encryption layers may be useful for protecting portions of transmitted data that may not be in an untranslated or otherwise conventionally encrypted state, such as, for example and not limitation, metadata.

BRIEF DESCRIPTION OF THE DRAWINGS

The accompanying drawings that are incorporated in and constitute a part of this specification illustrate several embodiments of the disclosure and, together with the description, serve to explain the principles of the disclosure:

FIG. 3B illustrates method steps of an exemplary process for initializing an authenticated session within a computing device configured for securing data, according to some embodiments of the present disclosure.

DETAILED DESCRIPTION

Figure 1:
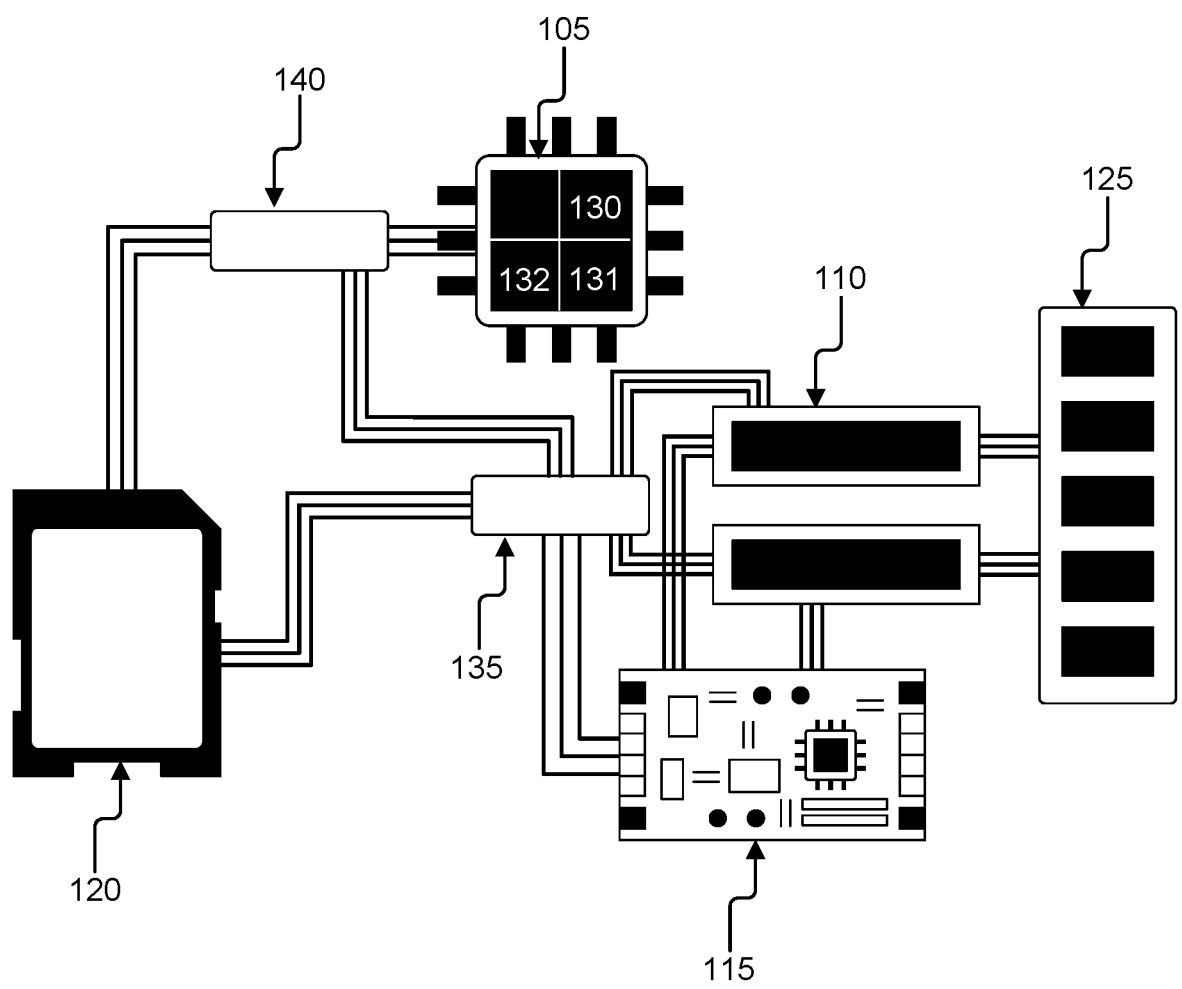
FIG. 1 illustrates an exemplary computing device for securing data comprising a programmable integrated circuit, according to some embodiments of the present disclosure.

The present disclosure provides generally for systems and methods for securing data, such as, for example and not limitation, securing data during transfer, storage, or execution. In some embodiments, a system for securing data may comprise at least one computing device that comprises at least one programmable integrated circuit. In some embodiments, a first partitioned segment of the at least one programmable integrated circuit may comprise one or more factory-installed secrets in the form of data. In some aspects, data stored within at least one storage medium of the at least one computing device or sent from the at least one computing device may be altered to an untranslated state by the one or more factory-installed secrets before being stored or transmitted, respectively. In some implementations, data retrieved from storage or received from a second computing device may need to be altered to a translated state by the one or more factory-installed secrets to be used by the at least one computing device and/or comprehensible to at least one authenticated user of the computing device.

In the following sections, detailed descriptions of examples and methods of the disclosure will be given. The descriptions of both preferred and alternative examples, though thorough, are exemplary only, and it is understood to those skilled in the art that variations, modifications, and alterations may be apparent. It is therefore to be understood that the examples do not limit the breadth of the aspects of the underlying disclosure as defined by the claims.

GLOSSARY

Untranslated state: as used herein, refers to a form of data that is not comprehensible or usable by a computing device or a user of the computing device. In some aspects, an untranslated state of data may comprise a non-language. Throughout the present disclosure, the term "untranslated state" may be used interchangeably with the term "untranslated form."

Translated state: as used herein, refers to a form of data that is understandable by a computing device, a user of the computing device, or both. Throughout the present disclosure, the term "translated state" may be used interchangeably with the term "translated form."

Programmable integrated circuit: as used herein refers to a memory chip or similar device configured to store data or process code, wherein at least a portion of the chip is writable at least one time with at least one algorithm. In some aspects, the programmable integrated circuit may comprise one or more configurable logic blocks, wherein two or more logic blocks may be connected via one or more programmable interconnects. In some implementations, a programmable integrated circuit may comprise a field-programmable gate array (FPGA), wherein the FPGA may be programmable by a designer or end user after the FPGA has been produced by a manufacturer. In some embodiments, a programmable integrated circuit may comprise two or more partitioned segments, wherein each partitioned segment may be independently loadable and may be directed to one or more unique functions or purposes. In some implementations, a programmable integrated circuit may comprise a plurality of modifiable logic gates.

Partitioned segment: as used herein refers to an independently loadable section of a programmable integrated circuit that may comprise one or more logic gates that operate independently from other logic gates within the programmable integrated circuit. In some aspects, two or more partitioned segments may be communicatively connected via one or more switch matrices for the purpose of performing complex logical or computational processes involving the connected partitioned segments.

Non-language: as used herein refers to a configuration of data that comprises one or more symbols, characters, letters, numbers, or similar elements in a distorted order such that information contained within the data is incomprehensible by any computing device or any user of any computing device. In some aspects, no known available algorithm may exist for converting a non-language to an understandable language.

Untranslation: as used herein refers to a process for converting or transforming data from a translated state to an untranslated state, from an untranslated state to a translated state, or from a first untranslated state to a second untranslated state.

Procedurally unobservable: as used herein refers to the imperceptible nature of any electrical activity, including, by way of example and not limitation, data movement, data untranslation, or computation that may occur between execution cycles (or clock pulses) of a computing device.

Yields: as used herein refers to one or more outputs determined by one or more portions of electronic circuitry based at least partially on at least one received input. By way of example and not limitation, yields may comprise one or more untranslations of at least one datum facilitated by one or more factory-installed secrets.

Yield: as used herein refers to at least temporarily ceasing, suspending, or pausing one or more electronic or computational processes, functions, or operations until receiving at least one signal, input, or notification to resume or continue such processes, functions, or operations.

Referring now to FIG. 1, an exemplary computing device 100 for securing data comprising a programmable integrated circuit 105 is illustrated. In some aspects, computing device 100 may comprise at least one programmable integrated circuit 105. In some implementations, computing device 100 may comprise one or more processor registers 110 (shown as two processor registers 110 in FIG. 1). In some embodiments, the computing device 100 may comprise at least one processor 115. In some aspects, the computing device 100 may comprise at least one storage medium, such as hard drive 120 and/or storage device 125. By way of example and not limitation, storage device 125 may comprise random access memory (RAM), read-only memory (ROM), flash memory or erasable programmable read-only memory (EPROM), or any similar memory resource, as well as any combination thereof.

In some aspects, the programmable integrated circuit 105 may comprise two or more partitioned segments 130, 131, 132. In some implementations, each partitioned segment 130, 131, 132 may be independently loadable and configurable to serve at least one unique purpose within the programmable integrated circuit 105. In some non-limiting exemplary embodiments, a first partitioned segment 130 of the programmable integrated circuit 105 may comprise one or more factory-installed secrets in the form of data, where the factory-installed secrets may be writable only one time during the manufacturing of the programmable integrated circuit 105 and the associated computing device 100. In some implementations, the factory-installed secrets may be configured to convert data from an untranslated state to a translated state. In some embodiments, the factory-installed secrets may be configured to convert data from a translated state to an untranslated state. In some aspects, the factory-installed secrets may be configured to convert data from a first untranslated state to a second untranslated state. In other words, these configurations may be read-only, write-only, or read-write.

In some aspects, the factory-installed secrets of the first partitioned segment 130 of the programmable integrated circuit 105 may at least partially comprise data and logic configured to convert data in the form of one or more instructions for booting up or starting the computing device 100. By way of example and not limitation, the instructions for one or more boot processes for the computing device 100 may be stored within the hard drive 120 or one or more storage devices 125 of the computing device 100 in an untranslated state, such that the computing device 100 may not be able to use the instructions if they are accessed directly from their storage location within the hard drive 120 or storage device(s) 125. In some implementations, the instructions may need to be routed through the first partitioned segment 130 of the programmable integrated circuit 105 and patched through the factory-installed secrets therein so the instructions may be converted to a translated state before being sent to one or more processor registers 110 where the instructions may be read and used by the computing device 100 to boot and initialize loading for at least one computing purpose. In some implementations, a second partitioned segment 131 of the programmable integrated circuit 105 may comprise storage-at-rest data for one or more potentially authenticable users of the computing device 100. In some aspects, the second partitioned segment 131 of the programmable integrated circuit 105 may comprise data, wherein at least a portion of the data is used for authenticating at least one user of the computing device 100. In some non-limiting exemplary embodiments, a user may need to be authenticated before the factory-installed secrets of the first partitioned segment 130 of the programmable integrated circuit 105 may be utilized to start and boot the computing device 100 and initialize its operating system.

In some implementations, a user's storage-at-rest data may at least partially comprise data that may successfully authenticate the identity of the user when the user inputs data that matches the storage-at-rest secret for that user, thereby establishing an authenticated session within the computing device 100. By way of example and not limitation, storage-at-rest data for a user may comprise the expected and required results of a received password, retinal scan, Global Positioning System (GPS) determination, fingerprint scan, voice sample, facial scan, or palm scan, as well as any other appropriate biometric or information-based verification.

In some aspects, the storage-at-rest data for a user may further comprise geolocation data obtained from at least one geolocation sensor or device integrated with or communicatively coupled to the computing device 100. In some non-limiting exemplary embodiments, a first geolocation may be determined for the computing device 100 during a successful authentication of a user, wherein the geolocation data for the first geolocation may be bound to the input data received from the user during the authentication process. In some implementations, the user may be able to resume the previously-established authenticated session of the computing device 100 without being required to input data for authentication a second time as long as a second geolocation of the computing device 100 determined at the time of subsequent access is within a predetermined threshold distance of the first geolocation. By way of example and not limitation, if a plurality of servers are configured to host a virtual computing environment, a system administrator may be able to configure the servers without having to manually re-input the authentication data for every boot occurrence, providing that the server(s) being accessed have not moved more than a predetermined distance of [n] feet between attempts, which may indicate that the server(s) have left the confines of an authorized operating environment and may have been subjected to tampering.

In some aspects, the programmable integrated circuit 105 may facilitate the establishment of an authenticated session of the computing device 100 for a user that has been successfully authenticated. In some implementations, the programmable integrated circuit 105 may allow an authenticated user to access the translated form of data retrieved from at least one storage medium within the computing device 100 that the authenticated user may have permission to access. By way of example and not limitation, an authenticated user may have permission to access the translated form of data that was originated by the authenticated user during a previous authenticated session, or to access the translated form of data that was delivered to the authenticated user during a previous or current authenticated session.

In some implementations, an authenticated user may not be able to access data, including data comprising instructions for a boot process, that may be directed toward the functioning and operation of the computing device 100 during an authenticated session. In some embodiments, the second partitioned segment 131 of the programmable integrated circuit 105 of the computing device 100 comprising the storage-at-rest data for an authenticated user may be independently loadable from the first partitioned segment comprising the one or more factory-installed secrets such that even an authenticated user within an authenticated session may be unable to access, view, or modify the factory-installed secrets within the first portioned segment 130 of the programmable integrated circuit 105. To put it simply, even an authenticated user with administrative access may be prevented from interfacing with the programmable integrated circuit 105 of the computing device 100, wherein such user may be unable to use an electrical interface to gain access to the secrets installed within the programmable integrated circuit 105.

In some aspects, the programmable integrated circuit 105 may operate in front of and in advance of the rest of the hardware architecture of the computing device 100. That is, when the computing device 100 is first powered on and electricity is distributed to all of the components, the programmable integrated circuit 105 may initialize while all of the other components yield. Once signaled, processing within the computing device 100 may resume nominally. In some implementations, the execution cycles, or clock pulses, of the computing device 100 may not begin until a user is authenticated, for example and not limitation, by successfully responding to at least one login prompt by inputting a secret that matches the storage-at-rest data for the user within the second partitioned segment 131 of the programmable integrated circuit 105, thereby establishing an authenticated session within the computing device 100.

In some embodiments, an authenticated session may need to be established before the boot instructions for the computing device 100 are able to be routed from at least one storage medium of the computing device 100 through the programmable integrated circuit 105 and the one or more factory-installed secrets contained therein to be converted from an incomprehensible untranslated state to a useable translated state. In this configuration, the electromechanical infrastructure of the computing device 100, including the data stored anywhere therein, may be unbinded from the electrical protocol of the computing device 100 such that the electrical protocol of the computing device 100 may initialize independently of the electromechanical infrastructure, and only when directed to do so by the electromechanical infrastructure, as lead by the functioning of the programmable integrated circuit 105, which ultimately controls when the sequence of execution cycles of the computing device 100 begins, and the computing device 100 resumes boot.

In some aspects, the computing device 100 may comprise at least two bus systems, wherein a first bus system 135 may connect two or more portions of the computing device 100 to each other, while a second bus system 140 may be uniquely configured to connect one or more portions of the computing device 100 to the programmable integrated circuit 105. In some implementations, the computing device 100 may comprise at least one memory management system configured to direct data through the first bus 135 or the second bus 140, depending at least partially on whether an authenticated user is currently accessing, transferring, or storing data during an authenticated session, and whether data needs to be accessed or stored in its translated state or an untranslated state.

In some implementations, data may be converted to an untranslated state before being stored in at least one storage medium of the computing device 100, such as hard drive 120 or one or more storage devices 125. In some aspects, the untranslated state may comprise a non-language, wherein the non-language of the untranslated state may be generated by the factory-installed secrets within the first partitioned segment 130 of the programmable integrated circuit 105. In some non-limiting exemplary embodiments, the non-language may comprise a form of the data that maps back to the original form of the data via a nonlinear recurrence pattern bound to linear address space.

In some implementations, data may be converted to an untranslated state at least partially based on the number of bytes the data comprises, wherein the factory-installed secrets of the first partitioned segment 130 of the programmable integrated circuit 105 assign a memory address within at least one storage media of the computing device 100 for the untranslated form of the data based on how far each byte of data are offset from 0 or the origin of the stream. When data is later retrieved from the at least one storage media, the factory-installed secrets may convert the data to its translated state based on the location address of the data within the at least one storage medium.

In some embodiments, an authenticated user within an authenticated session of the computing device 100 may be able to retrieve the translated form of data that is stored within at least one storage media of the computing device 100 in an untranslated state. Because the user is authenticated and an authenticated session is active, a plurality of logic gates within a third partitioned segment 132 of the programmable integrated circuit 105 may be configured in a combination of on and off states that allow data to be routed through the programmable integrated circuit 105 from at least one storage media of the computing device 100 and the memory management system of the computing device 100 may instruct a transceiver processor to retrieve data that is accessible by the authenticated user from the at least one storage media of the computing device 100 via the second bus system 140 instead of the first bus system 135, thereby retrieving the data routed through the programmable integrated circuit 105 that has been exposed to the one or more factory-installed secrets contained therein that may convert the data to its translated state while being directed to the processor register(s) 110 for use, without incurring a clock cycle penalty. In some aspects, the transceiver processor may direct whether data flows through the first bus system 135 or the second bus system 140 by controlling the state of each gate within each bus system 135, 140.

In some aspects, the programmable integrated circuit 105 may be configured to transform data without incurring any additional execution or clock cycle penalty beyond that of routine memory retrieval into a processor register 110. This may allow the programmable integrated circuit 105 to convert data between an untranslated state and a translated state in a manner that the computing device 100 perceives it to be instantaneous, thereby being declared unobservable by any software running on the platform of the computing device 100 at any layer. In some implementations, this technique of transforming data may occur without a clock cycle for the computing device 100 to interrogate the transformation, so that the transformation may be procedurally unobservable. In some embodiments, this conversion process may be procedurally unobservable to any authenticated or unauthenticated user, or even to the computing device 100 itself, as observable computing processes that would permit observation only occur during execution cycles of the computing device 100, or "on the clock."

In some aspects, the programmable integrated circuit 105 of the computing device 100 may be configured to facilitate one or more types of intrusion detection, wherein the programmable integrated circuit 105 may detect one or more indications of potential interference, tampering, hacking, or other unauthorized use. In some non-limiting exemplary embodiments, intrusion detection may comprise the use of sophisticated inductive probing test equipment and/or an analysis of to determine or detect any disturbances in the amount of power being consumed by or discharged from the first bus system 135 or the second bus system 140. In some implementations, by way of example and not limitation, unexpected disruptions in the electrical state of one or more partitioned segments 130, 131, 132 of the programmable integrated circuit 105 or abnormal time changes for one or more processes associated with the programmable integrated circuit 105 may indicate that an authorized attempt at data access may be underway. Upon detection of potential unauthorized access or tampering, the first partitioned segment 130 of the programmable integrated circuit 105 may be unloaded, cleared, or deleted, resulting in an immediate loss of the ability of the programmable integrated circuit 105 to convert any data from an untranslated state to a translated state, making the computing device 100 unable to read its own operating instructions and thereby stopping or preventing the computing device 100 from functioning and rendering access of the translated form of any data stored within any storage medium of the computing device 100 impossible.

Figure 2:
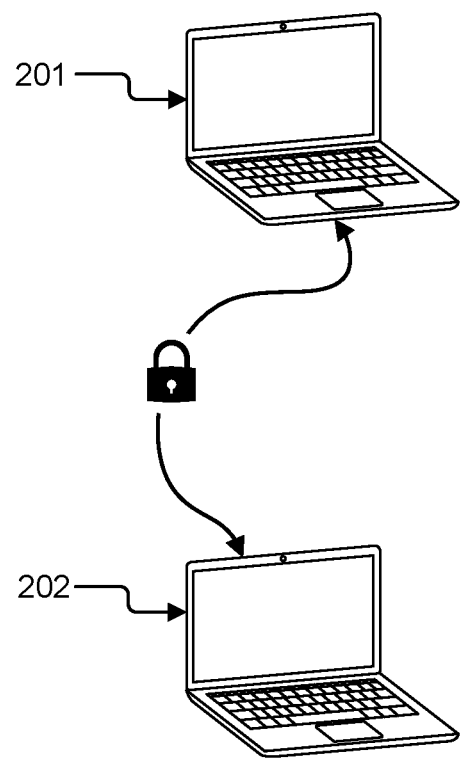
FIG. 2 illustrates an exemplary system for secure data transfer, according to some embodiments of the present disclosure.

Referring now to FIG. 2, an exemplary system 200 for secure data transfer is illustrated. In some aspects, system 200 may comprise two computing devices 201, 202 configured for secure data transfer and storage. In some embodiments, each computing device 200, 201 may comprise at least one programmable integrated circuit.

In some aspects, a secure relationship may be formed between a first computing device 201 and a second computing device 202, wherein upon formation of the secure relationship, the storage-at-rest data within the programmable integrated circuit of each respective computing device 201, 202 may be configured such that the first computing device 201 may gain the ability to send data to or receive data from the second computing device 202 in an untranslated state, and vice versa. In some embodiments, a first computing device 201 may form a relationship between a plurality of second computing devices 202. In other words, all untranslation relationships may be symmetric in nature, even multi-party methods.

In some implementations, a secure data transfer relationship formed between a first computing device 201 and a second computing device 202 may be partially facilitated by at least one external server. In some non-limiting exemplary embodiments, the at least one external server may comprise data that may be downloadable by the storage-at-rest partitioned segment of the programmable integrated circuit of each computing device 201, 202 requesting to establish a secure relationship for data transfer, wherein the data downloaded from the at least one external server may enable each computing device 201, 202 to become configured to convert data into an untranslated state to be sent to the other computing device 201, 202, and to accept untranslated data from the other computing device 201, 202 and to convert the received untranslated data to its translated state. In some aspects, this secure data transfer between the first computing device 201 and the second computing device 202 may be bi-directional, or any duplex equivalent.

In some aspects, data transferred between two or more computing devices 201, 202 may comprise one or more known secondary cryptographic security measures, wherein the secondary cryptographic security measures may be added as layers to untranslated data transferred between the computing devices 201, 202 to further enhance the secure nature of the data during transit. In some embodiments, a portion of the data, such as, for example and not limitation, metadata, may be transferred between two or more computing devices 201, 202 in a translated state, and at least the portion of the data in the translated state may be transferred using one or more known secondary cryptographic protections. In some implementations, pair-wise encryption among two or more computing devices 201, 202 may be additionally used as a tunneling method for data transport.

Figure 3A:
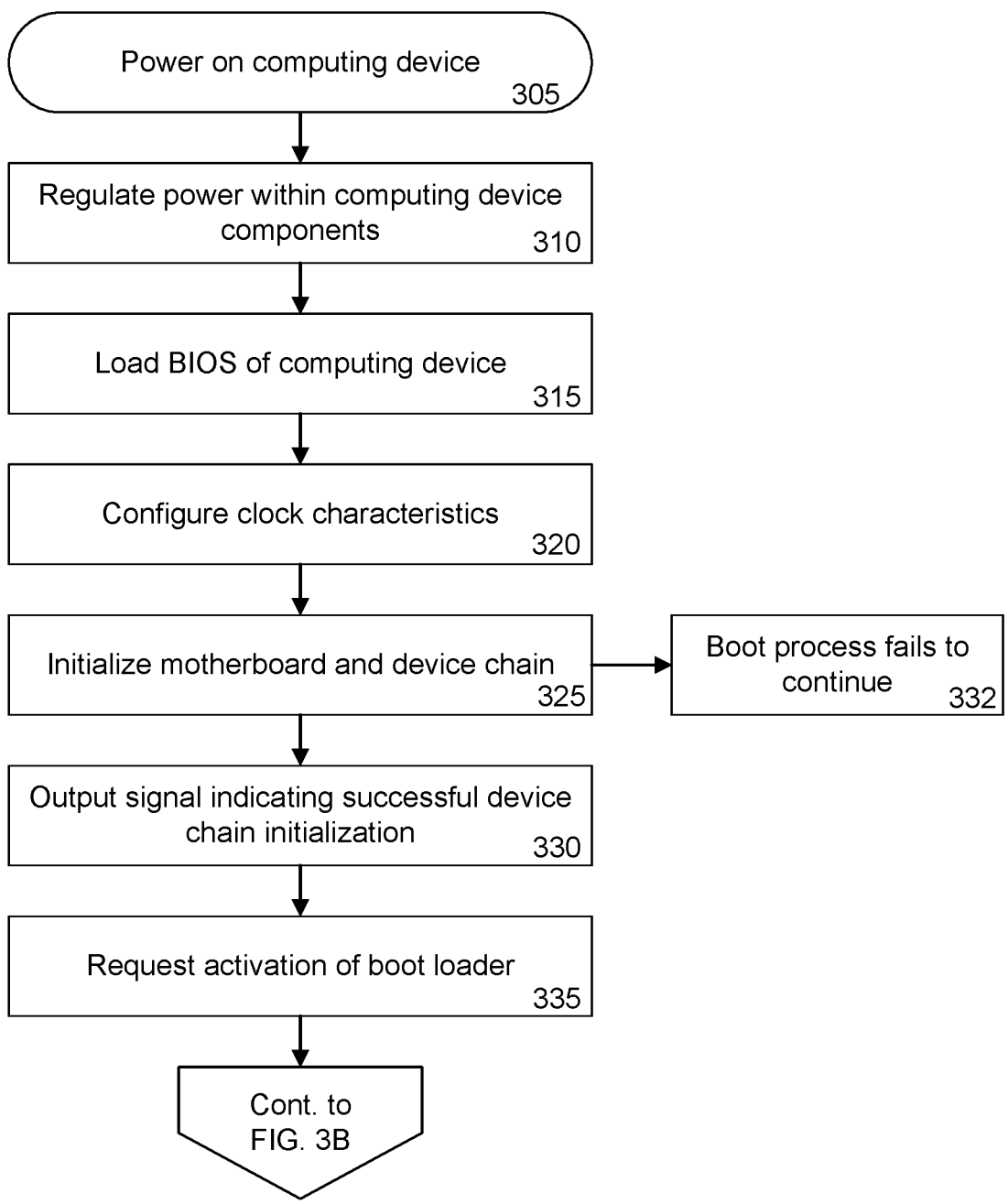
FIG. 3A illustrates method steps of an exemplary process for initializing an authenticated session within a computing device configured for securing data, according to some embodiments of the present disclosure.

Referring now to FIGS. 3A-B, method steps of an exemplary process 300 for initializing an authenticated session within a computing device configured for securing data are illustrated. In some aspects, at 305, the computing device may be powered on and an electrical current may be received by and distributed to the various components of the computing device, causing them to warm up and acquiesce to their natural state.

In some implementations, at 310, the power may become regulated within the various components of the computing device. In some embodiments, power regulation may occur naturally after enough time has passed for each component of the computing device to reach its minimum operating temperature and understand its natural state. In some implementations, the time required for power regulation to occur may be on the order of microseconds. By way of example and not limitation, the amount of time needed to achieve power regulation may be approximately seven microseconds.

In some aspects, at 315, the basic input/output system ("BIOS") of the computing device may be loaded from at least one storage medium within the computing device. In some implementations, at 320, the clock characteristics for the computing device may be configured. In some aspects, at 325, the motherboard and device chain of the computing device may be initialized. In some implementations, at 330, the device chain may output at least one signal indicating that the device chain was successfully initialized.

In some implementations, at 332, the device chain may not output at least one successful initiation signal, and therefore the boot process may fail to continue. In some aspects, at 335, the motherboard may request activation of a boot loader stored within at least one storage medium of the computing device, such as, for example and not limitation, the hard drive of the computing device. In some implementations, at 340, the computing device may initiate a login sequence, wherein the login sequence may be at least partially initiated by one or more factory-installed secrets within a partitioned segment of at least one programmable integrated circuit within the computing device. In some non-limiting exemplary embodiments, the programmable integrated circuit may comprise an FPGA.

In some aspects, at 345, the computing device may provide at least one login prompt to at least one user of the computing device. In some implementations, at 350, at least one authentication input may be received from at least one user of the computing device, wherein any such user may provide one or more authentication inputs in response to the login prompt, wherein each authentication input may comprise informational data received from the at least one user that may facilitate verification of the identity of the at least one user. By way of example and not limitation, an authentication input may comprise a password, a voice sample, at least one biometric input, or any similar information.

By way of further example and not limitation, the login prompt itself may comprise a request for a password input, an indication that at least one voice sample is ready to be received by the computing device, an indication that at least one biometric input is ready to be received by the computing device, or a request for or indication of any other means of authenticating the identity of the at least one user, as well as any combination thereof. By way of still further example and not limitation, the at least one biometric input may comprise a facial scan, a fingerprint scan, a palm scan, or a retinal scan, including but not limited to any form of biomatter which may comprise any adequate combinatorial description.

In some implementations, at 355, the computing device may acquire an operating system session. In some aspects, at 360, the programmable integrated circuit may determine if the informational data received from the at least one user during the login prompt matches storage-at-rest authentication data for the at least one user within the storage-at-rest partitioned segment of the programmable integrated circuit.

In some implementations, at 365, a partitioned segment within the programmable integrated circuit may facilitate the flow of data comprising instructions for initializing and running the operating system session by directing the data from the at least one storage medium of the computing device, through the partitioned segment of the programmable integrated circuit comprising one or more factory-installed secrets, and out of the programmable integrated circuit via a bus system that transmits the data to one or more processor registers of the computing device for use, wherein the instructional data for the operating system session may be converted from its untranslated state to its translated state by the one or more factory-installed secrets contained within the programmable integrated circuit.

In some aspects, at 370, if it is determined that a sufficient match does not exist between the informational data received from the at least one user and the data within the storage-at-rest partitioned segment of the programmable integrated circuit, the one or more factory-installed secrets within the first partitioned segment of the programmable integrated circuit may be offloaded or otherwise cleared, thereby eliminating the only means for converting the data for operating system instructions from its untranslated state to its translated state, thus, at 385, the computing device may be rendered unusable and access to the translated form of any data stored within any storage medium of the computing device may be prevented. In some implementations, the factory-installed secrets may be offloaded after a predetermined number of unsuccessful attempts to provide informational data that sufficiently matches the stored authentication data for the at least one user.

In some implementations, at 375, the operating system session may be initialized. In some embodiments, at 380, the factory-installed secrets of the programmable integrated circuit may initiate the first execution cycle, or clock pulse, of the execution cycles of the computing device when the operating system session begins.

Figure 4:
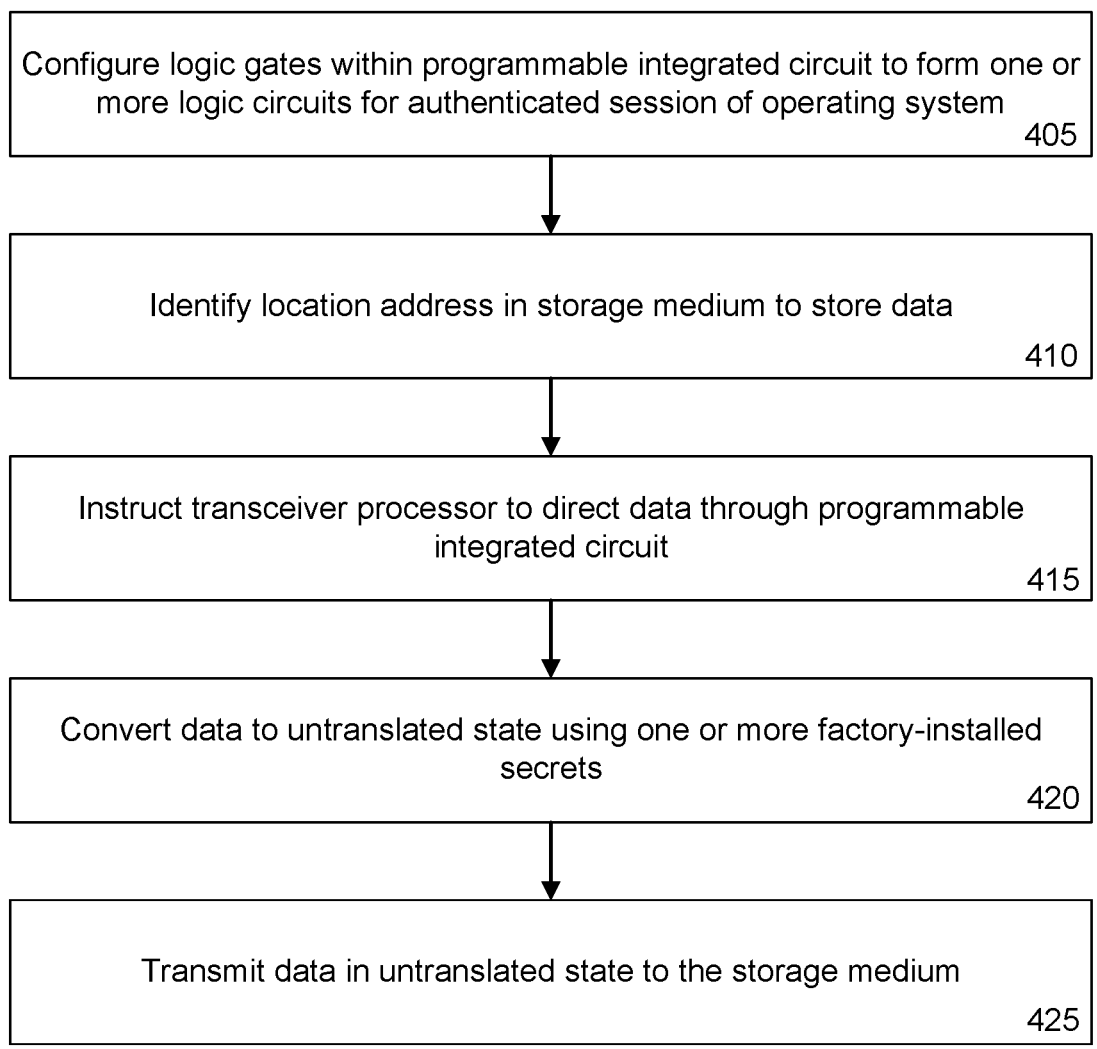
FIG. 4 illustrates method steps of an exemplary process for storing data in at least one storage medium within a computing device configured for securing data, according to some embodiments of the present disclosure.

Referring now to FIG. 4, method steps of an exemplary process 400 for storing data in at least one storage medium within a computing device configured for securing data are illustrated. In some aspects, the computing device may comprise at least one programmable integrated circuit. In some implementations, the programmable integrated circuit may comprise two or more independently loadable portioned segments.

By way of example and not limitation, a first partitioned segment of the programmable integrated circuit may comprise one or more factory-installed secrets in the form of data, wherein the one or more factory-installed secrets may be configured to convert data between a translated state and an untranslated state, or from a first untranslated state to a second untranslated state. In some aspects, a second partitioned segment of the programmable integrated circuit may comprise storage-at-rest data for authenticating at least one user of the computing device. In some implementations, a third partitioned segment of the programmable integrated circuit may comprise one or more logic gates that, based on a combination of their respective on or off states, facilitate the flow of data through the programmable integrated circuit to other portions of the computing device, such as via at least one bus system. In some aspects, the third partitioned segment may only facilitate the flow of data through the programmable integrated circuit during an authenticated session of the computing device for an authenticated user, such that no test harnesses of the programmable integrated circuit are exposed.

In some implementations, at 405, the one or more logic gates within the third partitioned segment of the programmable integrated circuit may be configured to form one or more logic circuits based on a currently authenticated user of a current authenticated session of the operating system of the computing device.

In some aspects, at 410, a memory management system within the computing device may identify a location address in the at least one storage medium of the computing device at which to store data. In some implementations, at 415, the memory management system may instruct a transceiver processor of the computing device to direct data for storage through at least one bus system communicatively coupled to a programmable integrated circuit within the computing device such that data to be stored may be transmitted through the programmable integrated circuit.

In some implementations, at 420, the first partitioned segment and the second partitioned segment of the programmable integrated circuit may function to form one or more logic circuits that collectively function to convert the data for storage into an untranslated state using the one or more factory-installed secrets while associating the data with the authenticated user of the current authenticated session of the computing device.

In some aspects, at 425, the untranslated form of the data may be transmitted to at least one storage medium within the computing device from the programmable integrated circuit.

Figure 5:
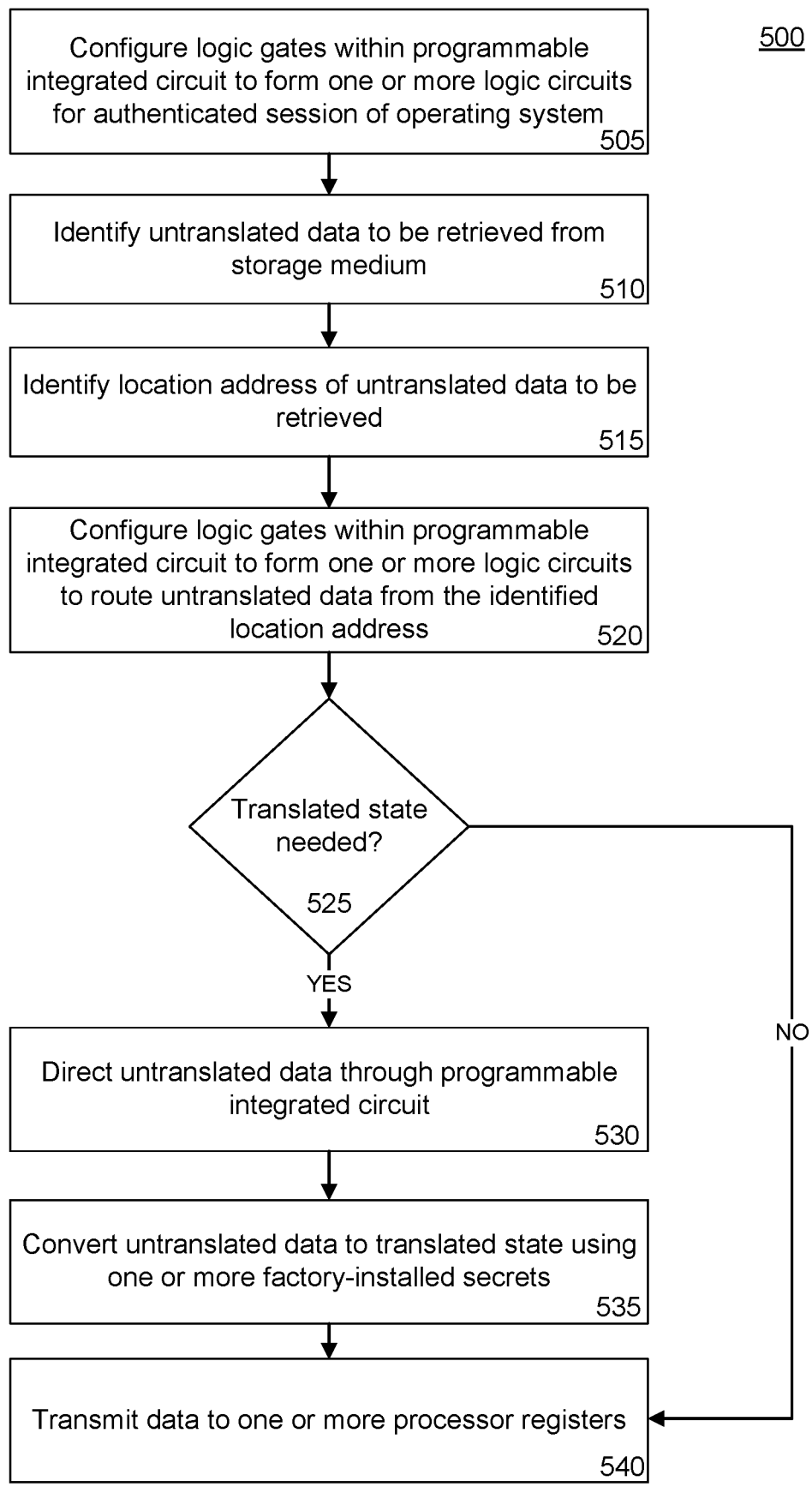
FIG. 5 illustrates method steps of an exemplary process for retrieving data from at least one storage medium within a computing device configured for securing data, according to some embodiments of the present disclosure.

Referring now to FIG. 5, method steps of an exemplary process 500 for retrieving data from at least one storage medium within a computing device configured for securing data are illustrated. In some embodiments, all of the data within the at least one storage medium of the computing device may be stored in an untranslated state. In some aspects, the computing device may comprise at least one programmable integrated circuit. In some implementations, the programmable integrated circuit may comprise two or more independently loadable partitioned segments.

By way of example and not limitation, a first partitioned segment of the programmable integrated circuit may comprise one or more factory-installed secrets in the form of data, wherein the one or more factory-installed secrets may be configured to convert data between a translated state and an untranslated state, or from a first untranslated state to a second untranslated state. In some non-limiting exemplary embodiments, a second partitioned segment of the programmable integrated circuit may comprise storage-at-rest data for potentially authenticating at least one user of the computing device. In some implementations, a third partitioned segment of the programmable integrated circuit may comprise one or more logic gates that may be configured in different combinations of on or off states to form one or more of a plurality of potential logical circuits to route data through the programmable integrated circuit based on an authenticated session of an operating system of the computing device for an authenticated user.

In some aspects, at 505, the one or more logic gates within the third partitioned segment of the programmable integrated circuit may be configured to form one or more logic circuits based on a currently authenticated user of a current authenticated session of the operating system of the computing device.

In some implementations, at 510, data may be identified that needs to be retrieved from the at least one storage medium of the computing device. By way of example and not limitation, data retrieval may be necessitated based on one or more interactions between the computing device and an authenticated user, or data may need to be retrieved in order to facilitate the performance of one or more functions or operations as determined by the computing device itself. In some embodiments, the data to be retrieved may be stored within the at least one storage medium in an untranslated state. In some aspects, at 515, the location address of the untranslated data to be retrieved may be identified by a memory management system of the computing device.

In some implementations, at 520, the programmable integrated circuit may use the location address determined by the memory management system to further configure the one or more logic gates within the third partitioned segment of the programmable integrated circuit to form one or more logic circuits configured to route untranslated data from the at least one storage medium at the identified location address. In some non-limiting exemplary embodiments, the third partitioned segment of the programmable integrated circuit may be configured between one or more execution cycles of the computing device such that upon identification of the location address of the data to be retrieved, the third partitioned segment may be immediately configured for data flow. In some aspects, multiple execution cycles of the computing device may be required to front-load the configurations of the third partitioned segment, such as, for example and not limitation, when multiple layers or stacks of untranslations may need to be configured; however, once the third partitioned segment is properly configured, translating data from an untranslated state to a translated state may occur without requiring additional execution cycles of the computing device as the data flows through the programmable integrated circuit. In other words, the configuration of each additional layer or stack may incur only front-loading penalties, not transformation time penalties.

In some aspects, at 525, the memory management system may determine whether the data to be retrieved from the at least one storage medium of the computing device is required to be in its translated state. By way of example and not limitation, data may need to be in its translated state to be used by one or more processor registers of the computing device and/or to be presented to an authenticated user of the computing device during an authenticated session of the operating system of the computing device. By way of further example and not limitation, data that is being transferred or copied within or without the computing device may not need to be converted to its translated state at any time during the transmission or copy.

In some implementations, at 530, retrieved data that needs to be converted to its translated state may be directed through the programmable integrated circuit based on the instruction of a transceiver processor that causes the data to transceive a main bus system of the computing device and instead flow through at least one bus system communicatively coupled to the programmable integrated circuit. In some aspects, at 535, the retrieved data may be converted from its untranslated state to its translated state via the one or more factory-installed secrets within the first partitioned segment of the programmable integrated circuit.

In some implementations, at 540, the retrieved data may be transmitted to one or more processor registers of the computing device via the bus system communicatively coupled to the programmable integrated circuit. In some aspects, data transmitted to the processor register(s) of the computing device in its translated state may be used, transferred, and/or copied by the processor register(s), while data transmitted to the processor register(s) in an untranslated state may be transferred or copied by the processor register(s). In some non-limiting exemplary embodiments, the conversion and/or transmittal of the data may occur between one or more execution cycles of the computing device, thereby allowing the conversion and/or transmittal of the data to be completed immediately after an execution cycle wherein the memory management system identifies the location address of the data for retrieval within the at least one storage medium of the computing device and before the subsequent execution cycle of the computing device, thus causing the conversion and/or transmission of data to seem instantaneous to the computing device, thereby causing any transformation of the data to its translated state to be unobservable.

Figure 6:
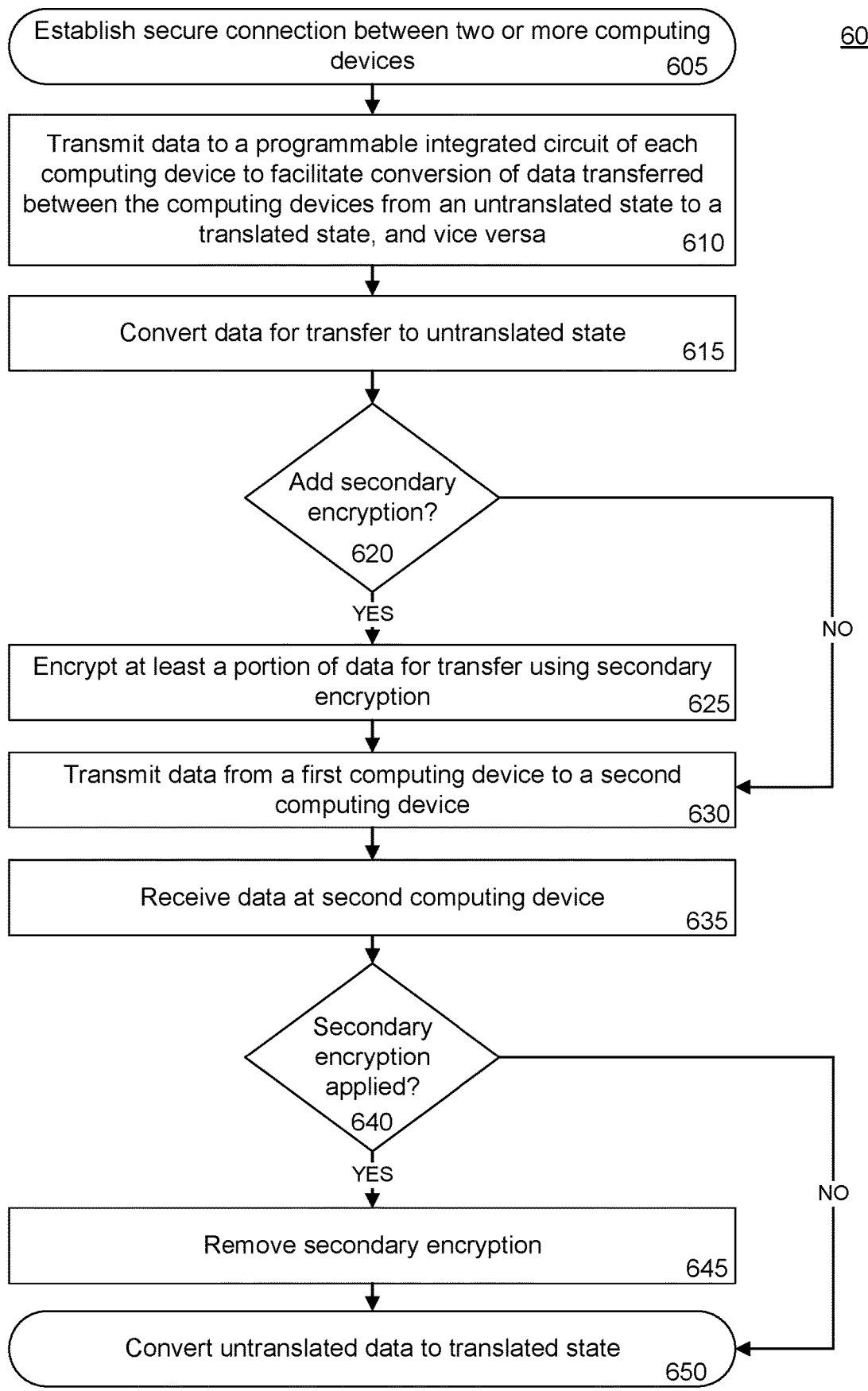
FIG. 6 illustrates method steps of an exemplary process for transferring data between two or more computing devices configured for securing data, according to some embodiments of the present disclosure.

Referring now to FIG. 6, method steps of an exemplary process 600 for transferring data between two or more computing devices configured for securing data are illustrated. In some aspects, each computing device may comprise at least one programmable integrated circuit. In some implementations, the programmable integrated circuit of each computing device may comprise two or more independently loadable partitioned segments. In some non-limiting exemplary embodiments, a first partitioned segment of each programmable integrated circuit may comprise one or more factory-installed secrets in the form of data, wherein the factory-installed secrets may be configured to convert data from an untranslated state to a translated state, and vice versa, or from a first untranslated state to a second untranslated state. In some aspects, the programmable integrated circuit of each computing device may comprise a second partitioned segment that comprises storage-at-rest data for one or more potentially authenticable users of the computing device.

In some aspects, at 605, a secure connection may be established between two or more computing devices, wherein a first computing device may request to form a secure relationship with a second computing device. In some non-limiting exemplary embodiments, a secure relationship between two or more computing devices may at least partially comprise a configuration wherein the first computing device establishes an authenticated identification of the second computing device and consents to receive data from and/or transmit data to the second computing device. Similarly, under the secure relationship the second computing device may establish an authenticated identification of the first computing device and consent to receive data from and/or transmit data to the first computing device, thereby facilitating full-duplex data transmission between the first computing device and the second computing device.

In some implementations, at 610, the second partitioned segment of the programmable integrated circuit of each computing device may receive data transmitted from at least one external server that enables each computing device to convert data sent to or received from one or more other computing devices from an untranslated state to a translated state, and vice versa.

In some aspects, at 615, data to be sent from the first computing device to the second computing device may be converted to an untranslated state by the programmable integrated circuit of the first computing device using the data received from the at least one external server.

In some embodiments, at 620, it may be determined whether the data to be transferred from the first computing device to the second computing device should comprise any type of additional secondary encryption. By way of example and not limitation, this determination may be at least partially based on one or more settings or preferences applied by an authenticated user of at least one of: the first computing device and the second computing device during an authenticated session of the associated first and/or second computing device.

In some implementations, at 625, the untranslated data to be transmitted from the first computing device to the second computing device may be encrypted using one or more known secondary encryption techniques. In some embodiments, a portion of the data being transmitted, such as, for example and not limitation, metadata, may remain in its translated state during transmission, and that portion of the data may be encrypted to provide a secure aspect to data that may not be compromising if accessed and viewed by one or more unauthorized individuals.

In some aspects, at 630, the untranslated data (as well as any associated translated data) may be transmitted from the first computing device to the second computing device via at least one public or private network, such as, for example and not limitation, the global public Internet or a local area network (LAN). In some aspects, at 635, the transmitted data may be received by the second computing device. In some implementations, at 640, it may be determined by the second computing device whether the received data comprises any secondary encryption layers. In some implementations, at 645, any applied secondary encryption layers may be removed by the second computing device upon receipt of the transmitted data using one or more unknown and internally patched encryption removal techniques. In some aspects, at 650, the received untranslated data may be converted to its translated state by the programmable integrated circuit of the second computing device using the data received from the at least one external server.

Figure 7:
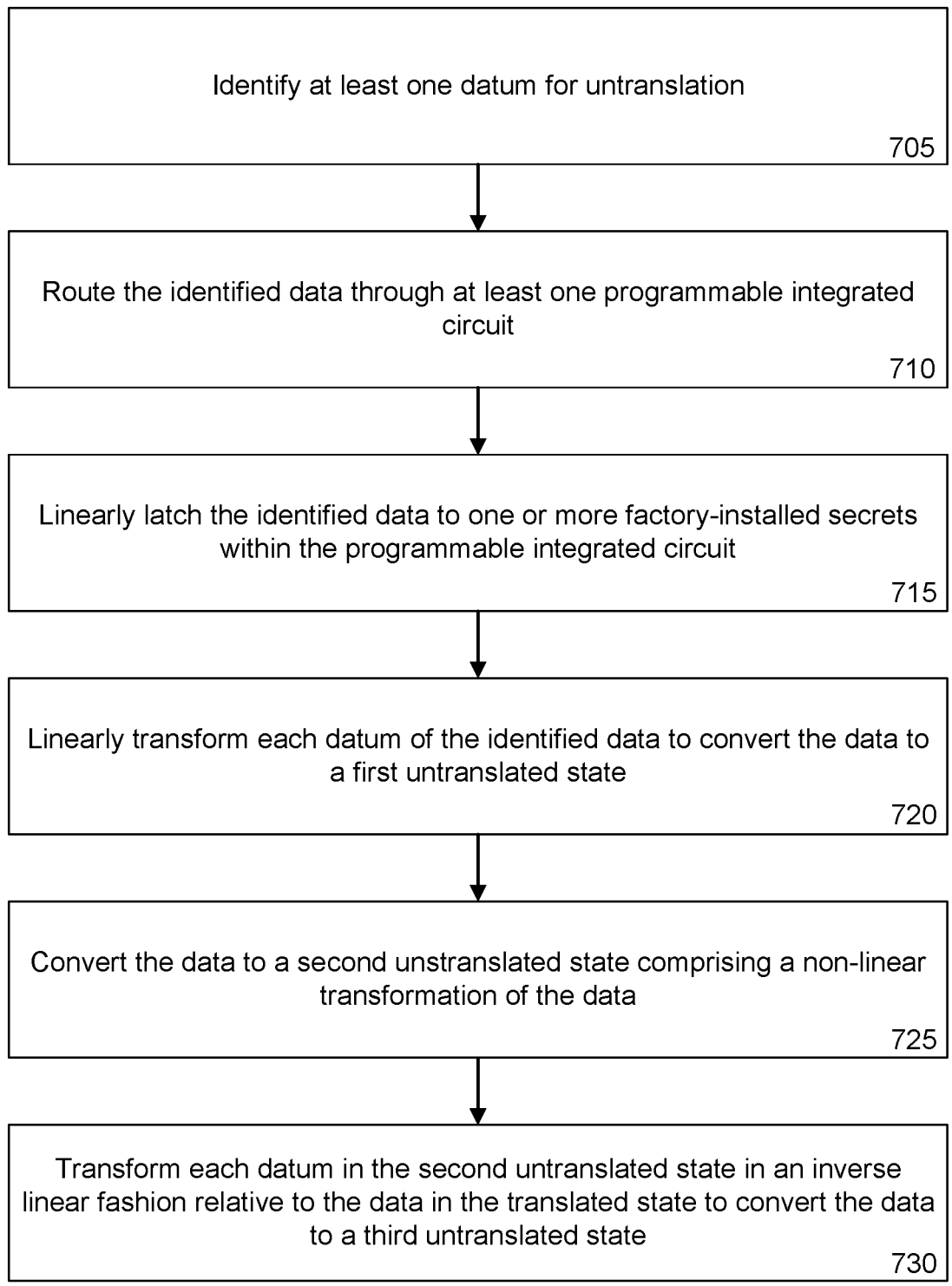
FIG. 7 illustrates method steps of an exemplary process for data untranslation, according to some embodiments of the present disclosure.

Referring now to FIG. 7, method steps of an exemplary process 700 for data untranslation are illustrated. In some aspects, process 700 may be at least partially facilitated by a computing device that comprises at least one programmable integrated circuit. In some implementations, the programmable integrated circuit may comprise two or more independently loadable partitioned segments.

By way of example and not limitation, a first partitioned segment of the programmable integrated circuit may comprise one or more factory-installed secrets in the form of data, wherein the one or more factory-installed secrets may be configured to facilitate untranslation of at least one datum, wherein data untranslation converts data from a translated state to an untranslated state, from an untranslated state to a translated state, or from a first untranslated state to a second untranslated state. In some non-limiting exemplary embodiments, a second partitioned segment of the programmable integrated circuit may comprise storage-at-rest data for potentially authenticating at least one user of the computing device. In some implementations, a third partitioned segment of the programmable integrated circuit may comprise one or more logic gates that may be configured in different combinations of on or off states to form one or more of a plurality of potential logical circuits to route data through the programmable integrated circuit based on an authenticated session of an operating system of the computing device for an authenticated user.

In some aspects, at 705, one or more data within a computing device may be identified for untranslation. By way of example and not limitation, the identification of data for untranslation may at least partially comprise selecting one or more data to be retrieved from or transmitted to at least one storage medium within the computing device. By way of further example and not limitation, one or more data may be identified for untranslation prior to being transmitted to at least one second computing device or after being received from at least one second computing device.

In some implementations, at 710, the data identified for untranslation may be routed through at least one programmable integrated circuit within the computing device. By way of example and not limitation, one or more logic gates within the third partitioned segment of the programmable integrated circuit may be configured to form one or more logic circuits based on a currently authenticated user of a current authenticated session of the operating system of the computing device to enable a memory management system of the computing device to identify a location address at which the data to be untranslated will be stored or retrieved from such that the programmable integrated circuit may use the location address determined by the memory management system to further configure the one or more logic gates within the third partitioned segment of the programmable integrated circuit to form one or more logic circuits configured to route data to or from the storage medium at the identified location address.

In some aspects, at 715, the factory-installed secrets within the first partitioned segment of the programmable integrated circuit may be linearly latched to the data identified for untranslation. In some non-limiting exemplary embodiments, at 720, the factory-installed secrets may linearly transform each datum of the data to a value that may be the same or different from the original value of the datum such that the data may be converted from a translated state to a first untranslated state, wherein the conversion of the data yields a first untranslation of the data facilitated by the factory-installed secrets. In some implementations when the data may or may not comprise a recurrence pattern, the linear transformation of the data may be directly bound to the address space of the storage medium of the computing device comprising the source or destination of the untranslated data.

In some embodiments, at 725, the factory-installed secrets may convert the data from the first untranslated state to a second untranslated state, wherein the conversion of the data yields a second untranslation of the data facilitated by the factory-installed secrets. In some aspects, the conversion of data from the first untranslated state to the second untranslated state may comprise a non-linear transformation of each datum, such that the recurrence pattern of the data in the second untranslated state may comprise a frequency that is greater than or less than the recurrence pattern of the data in the first untranslated state. In some implementations, the asymmetric nature of the recurrence patterns of the first untranslated state and the second untranslated state may increase the difficulty of predicting the structure of any shared secrets, making attempts to decode the secrets based on a linear pattern, futile.

In some aspects, at 730, the factory-installed secrets may transform each datum in the second untranslated state in an inverse linear fashion relative to the data in the translated state, wherein the transformation of the data yields a third untranslation of the data facilitated by the factory-installed secrets. In some implementations, this transformation may convert the data to a third untranslated state.

In some aspects, each transformation of the data performed by process 700 may occur between consecutive execution cycles of the computing device, thereby making the transformations procedurally unobservable to the computing device, any user of the computing device, or any external computing device or electronic apparatus. In some embodiments, the third untranslated state of the data may comprise no available recurrence pattern within the address space of the storage medium of the computing device due to the unobservable non-linear transformation of the data from the first untranslated state to the second untranslated state. Additionally, although the exemplary steps of process 700 have been presented in a sequential order, it is noted that, in some implementations, the order of the steps may be altered, and that, in some embodiments, some steps of process 700 may be omitted or repeated, thereby allowing process 700 to comprise any number of stacked or layered untranslations.

CONCLUSION

A number of embodiments of the present disclosure have been described. While this specification contains many specific implementation details, these should not be construed as limitations on the scope of any disclosures or of what may be claimed, but rather as descriptions of features specific to particular embodiments of the present disclosure.

Certain features that are described in this specification in the context of separate embodiments can also be implemented in combination or in a single embodiment. Conversely, various features that are described in the context of a single embodiment can also be implemented in combination in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking may be advantageous.

Moreover, the separation of various system components in the embodiments described above should not be understood as requiring such separation in all embodiments, and it should be understood that the described program components and systems can generally be integrated together in a single software/hardware product or packaged into multiple software/hardware products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous. Nevertheless, it will be understood that various modifications may be made without departing from the spirit and scope of the claimed disclosure.

What is claimed is:

1. A computing device for securing data, the computing device comprising:
   at least one processor register;
   at least one transceiver processor;
   at least one storage medium;
   at least one processor; a first bus system, wherein the first bus system communicatively couples the at least one processor register to the at least one storage medium;
   a second bus system; and
   at least one programmable integrated circuit, wherein the at least one programmable integrated circuit comprises two or more partitioned segments, wherein a first partitioned segment comprises one or more factory-installed secrets configured to convert data from an untranslated 'at-rest' state to a translated state, wherein the at least one programmable integrated circuit is communicatively coupled to the at least one processor register and the at least one storage medium via the second bus system;
   a second partitioned segment of the programmable integrated circuit may comprise storage-at-rest data for potentially authenticating at least one user of the computing device;
   a third partitioned segment of the programmable integrated circuit may comprise one or more logic gates that may be configured in different combinations of on or off states to form one or more of a plurality of potential logical circuits to route data through the programmable integrated circuit based on an authenticated session of an operating system of the computing device for an authenticated user;
   the one or more logic gates within the third partitioned segment of the programmable integrated circuit may be configured to form one or more logic circuits based on a currently authenticated user of a current authenticated session of the operating system of the computing device; and
   data may be identified that needs to be retrieved from the at least one storage medium of the computing device, data retrieval may be necessitated based on one or more interactions between the computing device and an authenticated user, or data may need to be retrieved in order to facilitate the performance of one or more functions or operations as determined by the computing device.

2. The computing device of claim 1, wherein one or more instructions for a boot process for the computing device are stored within the at least one storage medium in the untranslated state.

3. The computing device of claim 2, wherein a second partitioned segment of the at least one programmable integrated circuit comprises storage-at-rest data for at least one user of the computing device, wherein the storage-at-rest data is configured to authenticate the at least one user.

4. The computing device of claim 3, wherein authentication of the at least one user is required for the one or more factory-installed secrets within the first partitioned segment to convert the one or more instructions for the boot process from the untranslated state to the translated state.

\* \* \* \* \*